United States Patent
Liu et al.

(10) Patent No.: US 11,115,315 B2
(45) Date of Patent: Sep. 7, 2021

(54) DUPLICATION TRANSMISSION METHOD AND DEVICE

(71) Applicant: CHINA ACADEMY OF TELECOMMUNICATIONS TECHNOLOGY, Beijing (CN)

(72) Inventors: Aijuan Liu, Beijing (CN); Fangli Xu, Beijing (CN); Jiamin Liu, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 16/650,383

(22) PCT Filed: Sep. 19, 2018

(86) PCT No.: PCT/CN2018/106508
§ 371 (c)(1),
(2) Date: Mar. 25, 2020

(87) PCT Pub. No.: WO2019/062621
PCT Pub. Date: Apr. 4, 2019

(65) Prior Publication Data
US 2020/0228442 A1    Jul. 16, 2020

(30) Foreign Application Priority Data

Sep. 27, 2017   (CN) .......................... 201710890310.9

(51) Int. Cl.
*H04W 80/02* (2009.01)
*H04L 12/707* (2013.01)
*H04W 88/08* (2009.01)

(52) U.S. Cl.
CPC ............. *H04L 45/24* (2013.01); *H04W 80/02* (2013.01); *H04W 88/085* (2013.01)

(58) Field of Classification Search
None
See application file for complete search history.

(56) References Cited

U.S. PATENT DOCUMENTS

2012/0057560 A1    3/2012  Park et al.
2018/0376380 A1*  12/2018  Leroux .................. H04W 76/18
(Continued)

FOREIGN PATENT DOCUMENTS

CN            106538037 A       3/2017

OTHER PUBLICATIONS

CATT. "Discussion on Support of PDCP Duplication", 3GPP TSG-RAN WG3#99bis, R3-181795, SanYa China, Apr. 16-20, 2018.
(Continued)

*Primary Examiner* — Anh Vu H Ly
(74) *Attorney, Agent, or Firm* — Kilpatrick Townsend & Stockton LLP (57) ABSTRACT

A duplication transmission method and device, used for solving the problem in existing technology of a scheme for implementing packet data convergence protocol (PDCP) duplication having yet to be implemented in a central unit/distribute unit (CU/DU) separation scenario. According to the embodiments of the present invention, after determining the need for PDCP duplication transmission on a radio bearer, a CU sends a PDCP data packet transmitted on the radio bearer to a DU and instructs the DU to carry out the PDCP duplication transmission; and the DU sends the PDCP data packet to multiple radio link control (RLC) entities corresponding to the radio bearer so as to carry out the PDCP duplication transmission. Since the CU may instruct the DU to perform the PDCP duplication transmission, the PDCP data packet is subject to duplication transmission in the CU/DU separation scenario, thereby further improving the system performance.

11 Claims, 2 Drawing Sheets

(56) References Cited

U.S. PATENT DOCUMENTS

| | | | | |
|---|---|---|---|---|
| 2019/0335366 A1* | 10/2019 | Jin | ..................... | H04W 76/15 |
| 2020/0084682 A1* | 3/2020 | Wang | ................... | H04W 28/18 |
| 2020/0162211 A1* | 5/2020 | Wang | ................... | H04L 5/0037 |
| 2020/0163140 A1* | 5/2020 | Mochizuki | ............ | H04L 5/0098 |

OTHER PUBLICATIONS

Samsung et al. "PDCP Duplication Support in High Layer Functional Split", 3GPP TSG-RAN WG3 Meeting Ad Hoc, R3-172252, Qingdao, P. R. China, Jun. 27-29, 2017.

Intel Corporation. "Enhancements for PDCP Duplication in Xn-UP", 3GPP TSG RAN WG3 NR#2 Adhoc, R3-172294, Qingdao, China, Jun. 27-29, 2017.

Huawei: "PDCP duplication for CU-DU", 3GPP TSG RAN WG3 meeting #97, R3-173128, Berlin, Germany, Aug. 21-25, 2017.

Samsung et al., "Bearer management on supporting PDCP duplication in CA case", 3GPP TSG-RAN WG3 Meeting #97, Berlin, Germany Aug. 21-25, 2017, total 4 pages, R3-172968

Huawei,"L 1/L2 configuration for gNB-DU", 3GPP TSG RAN WG3 meeting #97,Berlin, Germany, Aug. 21-25, 2017, total 3 pages, R3-173127.

Huawei,"Discussions on F1 interface management",3GPP TSG-RAN3 Meeting # 97, Berlin, Germany, Aug. 21-25, 2017, total 3 pages, R3-173067.

CATT,"Discussion on CA based PDCP Duplication", 3GPP TSG-RAN WG3 Meeting #97bis, Prague, Czech Republic, Oct. 9-13, 2017, total 16 pages, R3-173593.

\* cited by examiner

DUPLICATION TRANSMISSION METHOD AND DEVICE

The present application is a U.S. National Stage of International Application No. PCT/CN2018/106508, filed on Sep. 19, 2018, which claims the priority from Chinese Patent Application No. 201710890310.9, filed with the Chinese Patent Office on Sep. 27, 2017, and entitled "Duplication Transmission Method and Device", which is hereby incorporated by reference in its entirety.

FIELD

The invention relates to the field of wireless communication technologies and particularly to a duplication transmission method and device.

BACKGROUND

In the LTE (Long Term Evolution) system, the E-UTRAN (Evolution-Universal Terrestrial Radio Access Network) is composed of multiple eNodeBs (evolved base stations), the eNodeBs and the EPC (Evolved Packet Core) are connected through the S1 interface, and the eNodeBs are connected through the X2 interface therebetween.

In the 5G system, the introduction of a CU (Central Unit) for centralized control and scheduling is considered. The RRC (Radio Resource Control) function and some functions of the layer 2 or/and layer 1 are deployed in the CU, and other functions of the base station are deployed in a DU (Distributed Unit). The interface (NG) between the base station and the core network terminates at the CU, and the interface (Xn) between the base stations also terminates at the CU.

The CU/DU separation modes at the RAN (Radio Access Network) side are divided into high-layer separation and low-layer separation, where the high-layer separation scheme is that the RRC and PDCP (Packet Data Convergence Protocol) are deployed at the CU; and the RLC (Radio Link Control), MAC (Medium Access Control), physical layer and RF (Radio Frequency) are deployed at the DU.

In order to support the reliable data transmission, the CA-based PDCP duplication transmission is introduced in the NR (New Radio), where one PDCP data packet is sent to two RLC entities under the same node.

For the scenario where the PDCP and RLC are located at the same node, the data transfer between the PDCP layer and the RLC layer is implemented internally. However, for the scenario of CU/DU separation, there is no clear solution on how to implement the PDCP duplication.

In view of the above, there is no solution of implementing the PDCP duplication in the scenario of CU/DU separation.

SUMMARY

The invention provides a duplication transmission method and device, so as to solve the problem in the prior art that there is no solution of implementing the PDCP duplication in the scenario of CU/DU separation.

An embodiment of the invention provides a duplication transmission method, which includes:
determining, by a CU, that PDCP duplication transmission needs to be performed on a radio bearer;
sending, by the CU, a PDCP data packet to be transmitted on the radio bearer to a DU, and instructing the DU to perform the PDCP duplication transmission.

An embodiment of the invention provides another duplication transmission method, which includes:
receiving, by a DU, a PDCP data packet which is sent by a CU and needs to be transmitted on a radio bearer, and information for instructing to perform PDCP duplication transmission;
sending, by the DU, the PDCP data packet to a plurality of RLC entities corresponding to the radio bearer for PDCP duplication transmission.

An embodiment of the invention provides a duplication transmission device, which includes: a processor, a memory and a transceiver; where the memory stores the data used by the processor when performing the operations, and the transceiver is configured to receive and send the data under the control of the processor;
where the processor is configured to read a program in the memory and perform:
determining that PDCP duplication transmission needs to be performed on a radio bearer, sending a PDCP data packet to be transmitted on the radio bearer to a DU, and instructing the DU to perform the PDCP duplication transmission.

An embodiment of the invention provides another duplication transmission device, which includes: a processor, a memory and a transceiver; where the memory stores the data used by the processor when performing the operations, and the transceiver is configured to receive and send the data under the control of the processor;
where the processor is configured to read a program in the memory and perform:
receiving a PDCP data packet which is sent by a CU and needs to be transmitted on a radio bearer, and information for instructing to perform PDCP duplication transmission; and sending the PDCP data packet to a plurality of RLC entities corresponding to the radio bearer for PDCP duplication transmission.

An embodiment of the invention provides a duplication transmission device, which includes:
a determining module configured to determine that PDCP duplication transmission needs to be performed on a radio bearer;
a notifying module configured to send a PDCP data packet to be transmitted on the radio bearer to a DU and instruct the DU to perform the PDCP duplication transmission.

An embodiment of the invention provides a duplication transmission device, which includes:
a receiving module configured to receive a PDCP data packet which is sent by a CU and needs to be transmitted on a radio bearer, and information for instructing to perform PDCP duplication transmission;
a processing module configured to send the PDCP data packet to a plurality of RLC entities corresponding to the radio bearer for PDCP duplication transmission.

An embodiment of the invention provides a computer readable storage medium storing a computer program thereon, where the program, when executed by a processor, implements the steps of the CU or the steps of the DU in the embodiments of the invention.

In the embodiments of the invention, after the CU determines that the PDCP duplication transmission needs to be performed on the radio bearer, the CU sends the PDCP data packet to be transmitted on the radio bearer to the DU and instructs the DU to perform the PDCP duplication transmission; the DU sends the PDCP data packet to a plurality of RLC entities corresponding to the radio bearer for PDCP duplication transmission. Since the CU may instruct the DU to perform the PDCP duplication transmission, thereby implementing the duplication transmission of the PDCP data packet in the scenario of CU/DU separation, and further improving the system performance.

BRIEF DESCRIPTION OF THE DRAWINGS

In order to illustrate the technical solutions in the embodiments of the invention more clearly, the accompanying figures which need to be used in describing the embodiments will be introduced below briefly. Obviously the accompanying figures described below are only some embodiments of the invention, and other accompanying figures can also be obtained by those ordinary skilled in the art according to these accompanying figures without creative labor.

DETAILED DESCRIPTION OF THE EMBODIMENTS

At first, some terms in the embodiments of the present application are explained so as to facilitate the understanding of those skilled in the art.

(1) In the embodiments of the present application, the nouns "network" and "system" are often used alternately, but those skilled in the art may understand the meaning thereof.

(2) The term "a plurality of" in the embodiments of the present application refers to two or more, and other quantifiers are similar thereto.

(3) "and/or" describes the association relationship of the associated objects, and indicates that there may be three relationships, for example, A and/or B may represent: only A, both A and B, and only B. The character "/" generally indicates that the associated objects have a kind of "or" relationship.

In order to make the objects, technical solutions and advantages of the invention clearer, the invention will be further illustrated below in details with reference to the accompanying drawings. Obviously the described embodiments are a part of the embodiments of the invention but not all the embodiments. Based upon the embodiments of the invention, all of other embodiments obtained by those ordinary skilled in the art without creative work pertain to the protection scope of the invention.

Figure 1:
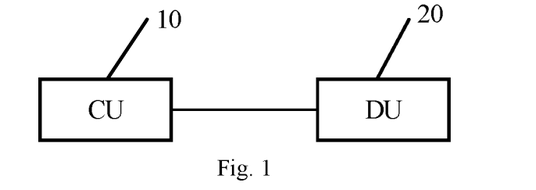
FIG. 1 is a structural schematic diagram of a system of performing the duplication transmission in an embodiment of the invention.

As shown in FIG. 1, a system of performing the duplication transmission according to an embodiment of the invention includes:

a CU 10 configured to determine that the PDCP duplication transmission needs to be performed on a radio bearer, send the PDCP data packet to be transmitted on the radio bearer to a DU, and instruct the DU to perform the PDCP duplication transmission;

a DU 20 configured to receive the PDCP data packet which is sent by the CU and needs to be transmitted on the radio bearer, and the information for instructing to perform the PDCP duplication transmission; and send the PDCP data packet to a plurality of RLC entities corresponding to the radio bearer for PDCP duplication transmission.

In the embodiment of the invention, after the CU determines that the PDCP duplication transmission needs to be performed on the radio bearer, the CU sends the PDCP data packet to be transmitted on the radio bearer to the DU and instructs the DU to perform the PDCP duplication transmission; and the DU sends the PDCP data packet to a plurality of RLC entities corresponding to the radio bearer for PDCP duplication transmission. Since the CU may instruct the DU to perform the PDCP duplication transmission, thereby implementing the duplication transmission of the PDCP data packet in the scenario of CU/DU separation, and further improving the system performance.

Here, the PDCP data packet may be a PDCP PDU (Protocol Data Unit).

The PDCP duplication transmission in the embodiment of the invention is to send the same PDCP data packet to a plurality of RLC entities, that is to say, the PDCP data packets received by the plurality of RLC entities are the same, and each RLC entity sends the received PDCP data packet, thereby implementing the effect of PDCP duplication transmission. Here, the executive body may be DU, CU, or another entity that can implement the similar functions.

The radio bearer in the embodiment of the invention includes DRB (Data Radio Bearer) and SRB (Signaling Radio Bearer). These cases will be illustrated below respectively.

First way: the radio bearer is an SRB.

Optionally, the CU sends the PDCP data packet to be transmitted on the SRB to the DU through the F1 control plane, and instructs the DU, through the IE (Information Element) in the corresponding F1 interface message, to perform the PDCP duplication transmission.

Correspondingly, the DU receives the PDCP data packet which is sent by the CU and needs to be transmitted on the radio bearer through the F1 control plane, and determines the information for instructing to perform the PDCP duplication transmission in the IE of the corresponding F1 interface message.

In an implementation, after the DU receives the PDCP data packet which is sent by the CU and needs to be transmitted on the radio bearer through the F1 control plane, the DU will search whether there is the information for instructing to perform the PDCP duplication transmission from the IE of the F1 interface message corresponding to the F1 control plane, and if so, it is determined that PDCP duplication transmission is needed for the received PDCP data packet; otherwise, it is determined that the PDCP duplication transmission is not needed for the received PDCP data packet.

The information for instructing to perform the PDCP duplication transmission may be represented by 1 bit, for example, 1 indicates that there is a need to perform the PDCP duplication transmission, and 0 indicates that there is no need to perform the PDCP duplication transmission.

It is also possible not to use 0 to indicate that there is no need to perform the PDCP duplication transmission, but to judge according to whether there is the information for instructing to perform the PDCP duplication transmission in the IE. If there is no information for instructing to perform the PDCP duplication transmission in the IE, it is determined that there is no need to perform the PDCP duplication transmission.

Here, the F1 interface message corresponding to the F1 control plane may be any message capable of transmitting the information for instructing to perform the PDCP duplication transmission, such as DL RRC message transfer (Downlink Radio Resource Control message transfer) message or the like.

Second way: the radio bearer is a DRB.

Optionally, the CU sends the PDCP data packet to be transmitted on the DRB to the DU through the F1 user plane, and instructs the DU to perform the PDCP duplication transmission in the corresponding data packet header of user plane.

Correspondingly, the DU receives the PDCP data packet which is sent by the CU and needs to be transmitted on the radio bearer through the F1 user plane, and determines the information for instructing to perform the PDCP duplication transmission in the corresponding data packet header of user plane.

In an implementation, after the DU receives the PDCP data packet which is sent by the CU and needs to be transmitted on the radio bearer through the F1 user plane, the DU will search whether there is the information for instructing to perform the PDCP duplication transmission from the data packet header of user plane corresponding to the F1 user plane, and if so, it is determined that the PDCP duplication transmission is needed for the received PDCP data packet; otherwise, it is determined that the PDCP duplication transmission is not needed for the received PDCP data packet.

The information for instructing to perform the PDCP duplication transmission may be represented by 1 bit, for example, 1 indicates that there is a need to perform the PDCP duplication transmission, and 0 indicates that there is no need to perform the PDCP duplication transmission.

It is also possible not to use 0 to indicate that there is no need to perform the PDCP duplication transmission, but to judge according to whether there is the information for instructing to perform the PDCP duplication transmission in the data packet header of user plane. If there is no information for instructing to perform the PDCP duplication transmission in the data packet header of user plane, it is determined that there is no need to perform the PDCP duplication transmission.

Optionally, the CU also needs to notify the DU to perform the transmission configuration before instructing the DU to perform the PDCP duplication transmission.

Specifically, the CU notifies the DU that the radio bearer supports the PDCP duplication transmission through the F1 interface message after determining that the radio bearer of the terminal supports the PDCP duplication transmission.

Correspondingly, the DU establishes a plurality of RLC entities and logical channels used by the PDCP duplication transmission for the radio bearer after receiving the notification of the CU that the radio bearer supports the PDCP duplication transmission through the F1 interface message.

In an implementation, the terminal may judge whether the radio bearer of the terminal may support the CA (Carrier Aggregation) based PDCP duplication transmission according to the UE's capability, network state and other information.

These cases will be illustrated below respectively when the radio bearer is DRB or SRB.

First way: the radio bearer is an SRB.

Specifically, the CU notifies the DU that the radio bearer supports the PDCP duplication transmission through the F1 interface message during the UE context setup process or the UE context update process.

Correspondingly, the DU establishes a plurality of RLC entities and logical channels used by the PDCP duplication transmission for the radio bearer after receiving the notification that the radio bearer supports the PDCP duplication transmission through the F1 interface message during the UE context setup process or the UE context update process.

Here, the F1 interface message may be any message capable of notifying the DU that the radio bearer supports the PDCP duplication transmission, such as DL RRC message transfer message or the like.

The MAC layer is responsible for the mapping of logical channels to transmission channels.

If there is no duplication transmission, one DRB corresponds to one RLC entity and one logical channel.

If there is the duplication (duplication transmission), one DRB corresponds to a plurality of RLC entities and a plurality of logical channels.

When the duplication transmission needs to be performed, the DU sends the PDCP data packet to each RLC entity corresponding to the radio bearer respectively, and each RLC entity sends the PDCP data packet after receiving it, thereby implementing the duplication transmission.

Second way: the radio bearer is a DRB.

Specifically, the CU notifies the DU that the radio bearer supports the PDCP duplication transmission through the F1 interface message during the UE context setup process or the UE context update (modify) process.

Correspondingly, the DU establishes a plurality of RLC entities and logical channels used by the PDCP duplication transmission for the radio bearer after receiving the notification that the radio bearer supports the PDCP duplication transmission through the F1 interface message during the UE context setup process or the UE context update process.

Here, the F1 interface message may be any message capable of transmitting the information for instructing to perform the PDCP duplication transmission, such as DL RRC message transfer message or the like.

The MAC layer is responsible for the mapping of logical channels to transmission channels.

If there is no duplication transmission, one DRB corresponds to one RLC entity and one logical channel.

If there is the duplication transmission, one DRB corresponds to a plurality of RLC entities and a plurality of logical channels.

When the duplication transmission needs to be performed, the DU sends the PDCP data packet to each RLC entity corresponding to the radio bearer respectively, and each RLC entity sends the PDCP data packet after receiving it, thereby implementing the duplication transmission.

Here, the terminal in the embodiments of the invention is also called User Equipment (UE), Mobile Station (MS), Mobile Terminal (MT), etc., and is a device for providing the voice and/or data connectivity to the user, e.g., a handheld device with the wireless connection function, a vehicle-carried device, etc. At present, some examples of the terminal are: mobile phone, tablet, laptop, palmtop computer, Mobile Internet Device (MID), wearable device, Virtual Reality (VR) device, Augmented Reality (AR) equipment, wireless terminal in the industrial control, wireless terminal in the self driving, wireless terminal in the remote medical surgery, and wireless terminal in the smart grid, wireless terminal in the transportation safety, wireless terminal in the smart city, wireless terminal in the smart home, etc.

Figure 2:
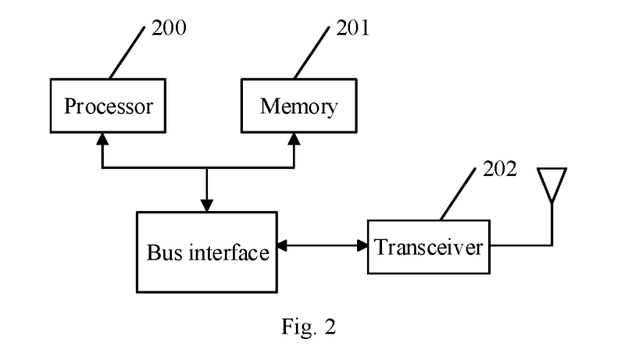
FIG. 2 is a structural schematic diagram of the first CU in an embodiment of the invention.

As shown in FIG. 2, the first CU in an embodiment of the invention includes: a processor 200, a memory 201, a transceiver 202, and a bus interface.

The processor 200 is responsible for managing the bus architecture and general processing, and the memory 201 may store the data used by the processor 200 when performing the operations. The transceiver 202 is configured to receive and send the data under the control of the processor 200.

The bus architecture may include any numbers of interconnected buses and bridges, and specifically link various circuits of one or more processors represented by the processor 200 and the memory represented by the memory 201. The bus architecture may further link various other circuits such as peripheral device, voltage regulator and power management circuit, which are all well known in the art and thus will not be further described again herein. The bus interface provides an interface. The processor 200 is responsible for managing the bus architecture and general processing, and the memory 201 may store the data used by the processor 200 when performing the operations.

The procedure disclosed by the embodiment of the invention may be applied in the processor 200 or implemented by the processor 200. In the implementation process, each step of the signal processing flow may be completed by the integrated logic circuit of hardware in the processor 200 or the instruction in the form of software. The processor 200 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the invention. The general-purpose processor may be a microprocessor or any conventional processor or the like. The steps of the method disclosed in combination with the embodiments of the invention may be directly completed by a hardware processor, or completed by a combination of hardware and software modules in the processor. The software modules may be located in the random access memory, flash memory, read only memory, programmable read only memory or electrically erasable programmable read only memory, register and other mature storage medium in the art. The storage medium is located in the memory 201, and the processor 200 reads the information in the memory 201 and completes the steps of the signal processing flow in combination with its hardware.

Specifically, the processor 200 is configured to read the program in the memory 201 and perform:

determining that the PDCP duplication transmission needs to be performed on a radio bearer, sending the PDCP data packet to be transmitted on the radio bearer to a DU, and instructing the DU to perform the PDCP duplication transmission.

Optionally, the processor 200 is specifically configured to: if the radio bearer is an SRB, then send the PDCP data packet to be transmitted on the SRB to the DU through the F1 control plane, and instruct the DU to perform the PDCP duplication transmission through the IE in the corresponding F1 interface message; or if the radio bearer is a DRB, then send the PDCP data packet to be transmitted on the DRB to the DU through the F1 user plane, and instruct the DU to perform the PDCP duplication transmission in the corresponding data packet header of user plane.

Optionally, the processor 200 is further configured to: notify the DU that the radio bearer supports the PDCP duplication transmission through the F1 interface message after determining that the radio bearer of the terminal supports the PDCP duplication transmission.

Optionally, the processor 200 is specifically configured to: notify the DU that the radio bearer supports the PDCP duplication transmission through the F1 interface message during the UE context setup process or the UE context update process.

Figure 3:
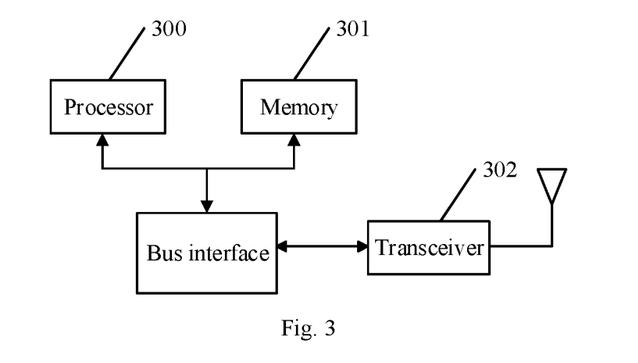
FIG. 3 is a structural schematic diagram of the first DU in an embodiment of the invention.

As shown in FIG. 3, the first DU in an embodiment of the invention includes:

The processor 300 is responsible for managing the bus architecture and general processing, and the memory 301 may store the data used by the processor 300 when performing the operations. The transceiver 302 is configured to receive and send the data under the control of the processor 300.

The bus architecture may include any numbers of interconnected buses and bridges, and specifically link various circuits of one or more processors represented by the processor 300 and the memory represented by the memory 301. The bus architecture may further link various other circuits such as peripheral device, voltage regulator and power management circuit, which are all well known in the art and thus will not be further described again herein. The bus interface provides an interface. The processor 300 is responsible for managing the bus architecture and general processing, and the memory 301 may store the data used by the processor 300 when performing the operations.

The procedure disclosed by the embodiment of the invention may be applied in the processor 300 or implemented by the processor 300. In the implementation process, each step of the signal processing flow may be completed by the integrated logic circuit of hardware in the processor 300 or the instruction in the form of software. The processor 300 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the invention. The general-purpose processor may be a microprocessor or any conventional processor or the like. The steps of the method disclosed in combination with the embodiments of the invention may be directly completed by a hardware processor, or completed by a combination of hardware and software modules in the processor. The software modules may be located in the random access memory, flash memory, read only memory, programmable read only memory or electrically erasable programmable read only memory, register and other mature storage medium in the art. The storage medium is located in the memory 301, and the processor 300 reads the information in the memory 301 and completes the steps of the signal processing flow in combination with its hardware.

Specifically, the processor 300 is configured to read the program in the memory 301 and perform:

receiving the PDCP data packet which is sent by a CU and needs to be transmitted on a radio bearer, and the information for instructing to perform the PDCP duplication transmission; and sending the PDCP data packet to a plurality of RLC entities corresponding to the radio bearer for PDCP duplication transmission.

Optionally, the processor 300 is specifically configured to: if the radio bearer is an SRB, then receive the PDCP data packet which is sent by the CU and needs to be transmitted on the radio bearer through the F1 control plane, and determine the information for instructing to perform the PDCP duplication transmission in the IE of the corresponding F1 interface message; or if the radio bearer is a DRB, then receive the PDCP data packet which is sent by the CU and needs to be transmitted on the radio bearer through the F1 user plane, and determine the information for instructing to perform the PDCP duplication transmission in the corresponding data packet header of user plane.

Optionally, the processor 300 is further configured to:

establish a plurality of RLC entities and logical channels used by the PDCP duplication transmission for the radio bearer after receiving the notification of the CU that the radio bearer supports the PDCP duplication transmission through the F1 interface message.

Optionally, the processor 300 is further configured to:

allocate a different TNL (Transport Network Layer) address for each logical channel if the radio bearer is a DRB after receiving the notification of the CU that the radio bearer supports the PDCP duplication transmission through the F1 interface message.

In an implementation, the above-mentioned memories in FIG. 2 and FIG. 3 may also be external to the CU and DU as the external storage devices.

Figure 4:
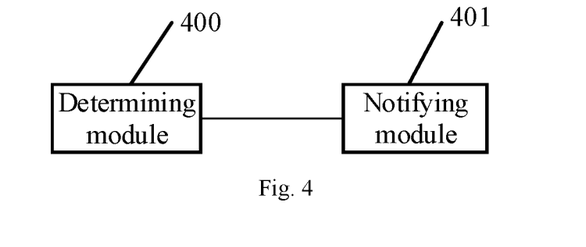
FIG. 4 is a structural schematic diagram of the second CU in an embodiment of the invention.

As shown in FIG. 4, the second CU in an embodiment of the invention includes:

a determining module 400 configured to determine that the PDCP duplication transmission needs to be performed on a radio bearer;

a notifying module 401 configured to send the PDCP data packet to be transmitted on the radio bearer to a DU and instruct the DU to perform the PDCP duplication transmission.

Optionally, the notifying module 401 is specifically configured to:

if the radio bearer is an SRB, then send the PDCP data packet to be transmitted on the SRB to the DU through the F1 control plane, and instruct the DU to perform the PDCP duplication transmission through the IE in the corresponding F1 interface message; or if the radio bearer is a DRB, then send the PDCP data packet to be transmitted on the DRB to the DU through the F1 user plane, and instruct the DU to perform the PDCP duplication transmission in the corresponding data packet header of user plane.

Optionally, the notifying module 401 is further configured to:

notify the DU that the radio bearer supports the PDCP duplication transmission through the F1 interface message after determining that the radio bearer of the terminal supports the PDCP duplication transmission.

Optionally, the notifying module 401 is specifically configured to:

notify the DU that the radio bearer supports the PDCP duplication transmission through the F1 interface message during the UE context setup process or the UE context update process.

Figure 5:
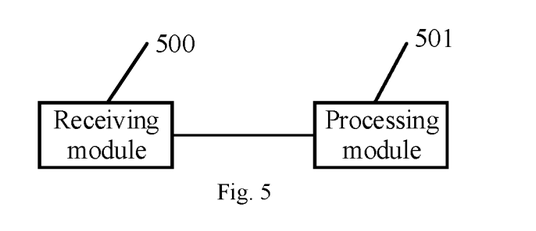
FIG. 5 is a structural schematic diagram of the second DU in an embodiment of the invention.

As shown in FIG. 5, the second DU in an embodiment of the invention includes:

a receiving module 500 configured to receive the PDCP data packet which is sent by a CU and needs to be transmitted on a radio bearer, and the information for instructing to perform the PDCP duplication transmission;

a processing module 501 configured to send the PDCP data packet to a plurality of RLC entities corresponding to the radio bearer for PDCP duplication transmission.

Optionally, the processing module 501 is specifically configured to:

if the radio bearer is an SRB, then receive the PDCP data packet which is sent by the CU and needs to be transmitted on the radio bearer through the F1 control plane, and determine the information for instructing to perform the PDCP duplication transmission in the IE of the corresponding F1 interface message; or if the radio bearer is a DRB, then receive the PDCP data packet which is sent by the CU and needs to be transmitted on the radio bearer through the F1 user plane, and determine the information for instructing to perform the PDCP duplication transmission in the corresponding data packet header of user plane.

Optionally, the processing module 501 is further configured to:

establish a plurality of RLC entities and logical channels used by the PDCP duplication transmission for the radio bearer after receiving the notification of the CU that the radio bearer supports the PDCP duplication transmission through the F1 interface message.

Optionally, the processing module 501 is further configured to:

allocate a different TNL address for each logical channel if the radio bearer is a DRB after receiving the notification of the CU that the radio bearer supports the PDCP duplication transmission through the F1 interface message.

An embodiment of the invention further provides a computer readable storage medium storing a computer program thereon, where the program, when executed by a processor, implements the steps of the CU or the steps of the DU described above.

Based upon the same inventive concept, an embodiment of the invention further provides a duplication transmission method. Since the device corresponding to this method is the CU in the system of performing the duplication transmission in the embodiments of the invention and the principle solving the problem of this method is similar to that of the device, the implementations of this method may refer to the implementations of the device, and the repeated description thereof will be omitted here.

Figure 6:
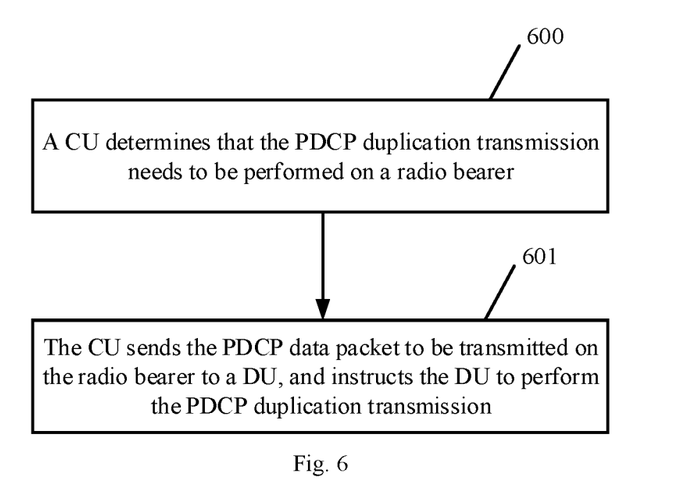
FIG. 6 is a flow schematic diagram of a method of the duplication transmission at the CU side in an embodiment of the invention.

As shown in FIG. 6, the method of the duplication transmission at the CU side in an embodiment of the invention includes:

Step 600: a CU determines that the PDCP duplication transmission needs to be performed on a radio bearer;

Step 601: the CU sends the PDCP data packet to be transmitted on the radio bearer to a DU, and instructs the DU to perform the PDCP duplication transmission.

Optionally, the step in which the CU sends the PDCP data packet to be transmitted on the radio bearer to the DU and instructs the DU to perform the PDCP duplication transmission includes:

if the radio bearer is an SRB, then the CU sends the PDCP data packet to be transmitted on the SRB to the DU through the F control plane, and instructs the DU to perform the PDCP duplication transmission through the IE in the corresponding F1 interface message; or if the radio bearer is a DRB, then the CU sends the PDCP data packet to be transmitted on the DRB to the DU through the F1 user plane, and instructs the DU to perform the PDCP duplication transmission in the corresponding data packet header of user plane.

Optionally, before the CU sends the PDCP data packet transmitted on the radio bearer to the DU and instructs the DU to perform the PDCP duplication transmission, the method further includes:

the CU notifies the DU that the radio bearer supports the PDCP duplication transmission through the F1 interface message after determining that the radio bearer of the terminal supports the PDCP duplication transmission.

Optionally, the step in which the CU notifies the DU that the radio bearer supports the PDCP duplication transmission through the F1 interface message includes:

the CU notifies the DU that the radio bearer supports the PDCP duplication transmission through the F1 interface message during the UE context setup process or the UE context update process.

Based upon the same inventive concept, an embodiment of the invention further provides a duplication transmission method. Since the device corresponding to this method is the DU in the system of performing the duplication transmission in the embodiments of the invention and the principle solving the problem of this method is similar to that of the device, the implementations of this method may refer to the implementations of the device, and the repeated description thereof will be omitted here.

Figure 7:
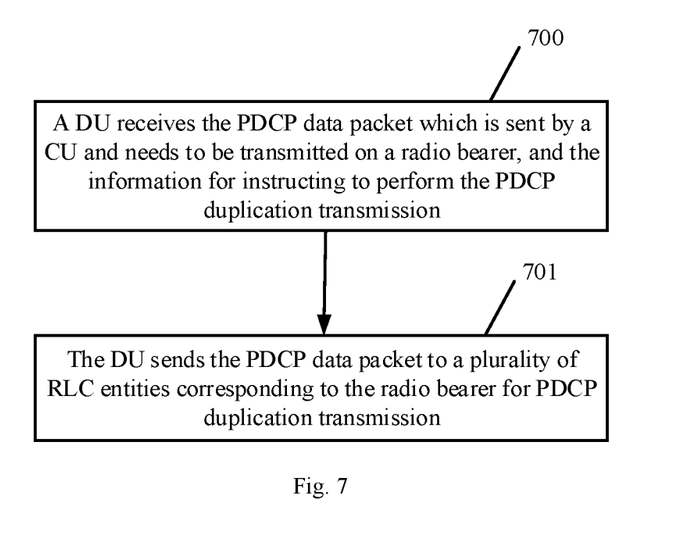
FIG. 7 is a flow schematic diagram of a method of the duplication transmission the DU side in an embodiment of the invention.

As shown in FIG. 7, the method of the duplication transmission at the DU side in an embodiment of the invention includes:

Step 700: a DU receives the PDCP data packet which is sent by a CU and needs to be transmitted on a radio bearer, and the information for instructing to perform the PDCP duplication transmission;

Step 701: the DU sends the PDCP data packet to a plurality of RLC entities corresponding to the radio bearer for PDCP duplication transmission.

Optionally, the step in which the DU receives the PDCP data packet which is sent by the CU and needs to be transmitted on the radio bearer and the information instructing the DU to perform the PDCP duplication transmission includes:

if the radio bearer is an SRB, then the DU receives the PDCP data packet which is sent by the CU and needs to be transmitted on the radio bearer through the F1 control plane, and determines the information for instructing to perform the PDCP duplication transmission in the IE of the corresponding F1 interface message; or if the radio bearer is a DRB, then the DU receives the PDCP data packet which is sent by the CU and needs to be transmitted on the radio bearer through the F1 user plane, and determines the information for instructing to perform the PDCP duplication transmission in the corresponding data packet header of user plane.

Optionally, before the DU receives the PDCP data packet which is sent by the CU and needs to be transmitted on the radio bearer and the information instructing the DU to perform the PDCP duplication transmission, the method further includes:

the DU establishes a plurality of RLC entities and logical channels used by the PDCP duplication transmission for the radio bearer after receiving the notification of the CU that the radio bearer supports the PDCP duplication transmission through the F1 interface message.

Optionally, after the DU receives the notification of the CU that the radio bearer supports the PDCP duplication transmission through the F1 interface message, the method further includes:

if the radio bearer is a DRB, then the DU allocates a different TNL address for each logical channel.

Several examples are given below to further explain the solution of the invention.

First Embodiment

In this example, the UE initially accesses the network, and the CU configures the SRB for the UE to support the duplication through the UE context setup process.

Step 1: the UE sends the MSG (message) 1 to the DU.

Step 2: the DU sends the MSG2 to the UE after receiving the MSG1.

Step 3: the UE sends the MSG3 to the DU after receiving the MSG2.

Step 4: the DU sends the PDCP PDU corresponding to the MSG3 passing through the L1 layer, MAC layer, and RLC layer to the CU through the F1 Application Protocol (F1AP) message, where the PDCP PDU carries some or all of the configuration parameters in the MAC layer, RLC layer, and L1 layer of the SRB1 after receiving the MSG3.

Step 5: the CU generates the MSG4 and sends it to the UE through the DU.

Step 6: the UE sends the connection establishment completion message to the network side.

Step 7: the UE and the network side establish the security mechanism.

Step 8: the CU notifies the DU through the UE context setup process after confirming that the UE can support the CA based PDCP duplication of the SRB.

Step 9: the DU establishes two RLC entities and logical channels for the corresponding SRB, and sends the configuration information to the CU.

Step 10: the CU assembles the RRC message and then sends it to the DU after passing through the PDCP layer of the CU.

Step 11: the DU sends the RRC message to the UE after the processing of the RLC layer, MAC layer, and L1 layer.

Second Embodiment

In this example, the CU configures a DRB for a UE to support the duplication through the UE context setup process.

Step 1: the CU receives the PDU session setup or DRB setup request from the core network.

Step 2: the CU provides the DRB-related information to the DU through the UE context setup and/or modify process. In this process, the CU notifies the DU that the DRB supports the CA-based PDCP duplication transmission.

Step 3: the DU needs to provide some or all configuration parameters in the RLC layer/MAC layer/PHY (physical) layer corresponding to the newly established DRB.

Specifically, the DU sends the configuration parameters to the CU; the CU assembles the RRC message and sends it to the DU through the PDCP layer of the CU; and then the DU sends the RRC message to the UE after the processing of some or all of the RLC layer, MAC layer, and L1 layer.

If the DU learns that a DRB needs to support the CA based PDCP duplication transmission in step 2, the DU establishes two RLC entities and logical channels for the DRB and simultaneously provides different TNL addresses for different logical channels.

Third Embodiment

In this example, the network side has configured the UE to support the CA-based PDCP duplication transmission of the SRB. The CU decides to perform the duplication transmission on the SRB at a certain moment.

Step 1: the network side configures the UE to support the CA-based PDCP duplication transmission of the SRB (the configuration process may specifically refer to the first embodiment described above).

Step 2: when the CU decides to perform the duplication transmission on the SRB when sending an RRC message, the CU carries an instruction in the F1AP message of the PDCP PDU corresponding to the RRC message sent to the DU to notify the DU to perform the duplication transmission for the data packet.

Step 3: the DU sends the received PDCP PDU to two RLC entities corresponding to the SRB according to the instruction, and performs the duplicated transmission.

Fourth Embodiment

In this example, the network side has configured the UE to support the CA-based PDCP duplication transmission of the DRB. The CU decides to perform the duplication transmission on the DRB at a certain moment.

Step 1: the network side configures the UE to support the CA-based PDCP duplication transmission of the DRB (the configuration process may specifically refer to the second embodiment described above).

Step 2: the CU sends the PDCP PDU to the DU through the user plane and carries an instruction for duplication in the packet header of the user plane, after deciding to perform the duplication transmission on the DRB.

Step 3: the DU sends the received PDCP PDU to two RLC entities corresponding to the DRB according to the parsed instruction of the user plane, and performs the duplicated transmission.

The present application has been described above by reference to the block diagrams and/or flow charts showing the methods, devices (systems) and/or computer program products according to the embodiments of the present application. It should be understood that one block shown in the block diagrams and/or flow charts and a combination of the blocks shown in the block diagrams and/or flow charts can be implemented by the computer program instructions. These computer program instructions can be provided to a general-purpose computer, a processor of a dedicated computer and/or another programmable data processing unit to produce a machine, so that the instructions executed by the computer processor and/or another programmable data processing unit create the methods for implementing the functions and/or actions specified in the blocks of the block diagrams and/or flow charts.

Accordingly, the present application can also be implemented by the hardware and/or software (including the firmware, resident software, microcode and the like). Further, the present application can adopt the form of computer program products on the computer usable or computer readable storage medium, which has the computer usable or computer readable program codes implemented in the medium, to be used by the instruction execution system or used in combination with the instruction execution system. In the context of the present application, the computer usable or computer readable storage medium can be any medium, which can contain, store, communicate with, transmit or transfer the programs, to be used by the instruction execution system, apparatus or device, or used in combination with the instruction execution system, apparatus or device.

Evidently those skilled in the art can make various modifications and variations to the invention without departing from the spirit and scope of the invention. Thus the invention is also intended to encompass these modifications and variations therein as long as these modifications and variations come into the scope of the claims of the invention and their equivalents.

What is claimed is:

1. A duplication transmission method, comprising:
determining, by a Central Unit, CU, that Packet Data Convergence Protocol, PDCP, duplication transmission needs to be performed on a radio bearer;
sending, by the CU, a PDCP data packet to be transmitted on the radio bearer to a Distribute Unit, DU, and instructing the DU to perform the PDCP duplication transmission;
wherein sending, by the CU, the PDCP data packet to be transmitted on the radio bearer to the DU, and instructing the DU to perform the PDCP duplication transmission, comprises:
if the radio bearer is a Signaling Radio Bearer, SRB, then sending, by the CU, the PDCP data packet to be transmitted on the SRB to the DU through F1 control plane, and instructing the DU to perform the PDCP duplication transmission through an Information Element, IE, in a corresponding F1 interface message; or
if the radio bearer is a Data Radio Bearer, DRB, then sending, by the CU, the PDCP data packet to be transmitted on the DRB to the DU through F1 user plane, and instructing the DU to perform the PDCP duplication transmission in a corresponding data packet header of user plane.

2. The method according to claim 1, wherein before the CU sends the PDCP data packet to be transmitted on the radio bearer to the DU and instructs the DU to perform the PDCP duplication transmission, the method further comprises:
notifying, by the CU, the DU that the radio bearer supports the PDCP duplication transmission through an F1 interface message, after determining that a radio bearer of a terminal supports PDCP duplication transmission.

3. The method according to claim 2, wherein notifying, by the CU, the DU that the radio bearer supports the PDCP duplication transmission through the F1 interface message, comprises:
notifying, by the CU, the DU that the radio bearer supports the PDCP duplication transmission through the F1 interface message during a UE context setup process or a UE context update process of the terminal.

4. A duplication transmission method, comprising:
receiving, by a DU, a PDCP data packet which is sent by a CU and needs to be transmitted on a radio bearer, and information for instructing to perform PDCP duplication transmission;
sending, by the DU, the PDCP data packet to a plurality of Radio Link Control, RLC, entities corresponding to the radio bearer for PDCP duplication transmission;
wherein receiving, by the DU, a PDCP data packet which is sent by a CU and needs to be transmitted on a radio bearer, and information instructing the DU to perform PDCP duplication transmission, comprises:
if the radio bearer is an SRB, then receiving, by the DU, the PDCP data packet which is sent by the CU and needs to be transmitted on the radio bearer through F1 control plane, and determining the information for instructing to perform PDCP duplication transmission in an Information Element, IE, of a corresponding F1 interface message; or
if the radio bearer is a DRB, then receiving, by the DU, the PDCP data packet which is sent by the CU and needs to be transmitted on the radio bearer through F1 user plane, and determining the information for instructing to perform PDCP duplication transmission in a corresponding data packet header of user plane.

5. The method according to claim 4, wherein before the DU receives the PDCP data packet which is sent by the CU and needs to be transmitted on the radio bearer and the information instructing the DU to perform PDCP duplication transmission, the method further comprises:
establishing, by the DU, a plurality of RLC entities and logical channels used by the PDCP duplication transmission for the radio bearer after receiving a notification of the CU that the radio bearer supports the PDCP duplication transmission through an F1 interface message.

6. The method according to claim 5, wherein after the DU receives the notification of the CU that the radio bearer supports the PDCP duplication transmission through the F1 interface message, the method further comprises:
if the radio bearer is a DRB, then allocating, by the DU, a different Transport Network Layer, TNL, address for each logical channel.

7. A duplication transmission device, comprising: a processor, a memory and a transceiver; wherein the memory stores data used by the processor when performing operations, and the transceiver is configured to receive and send data under control of the processor;
wherein the processor is configured to read a program in the memory and perform:
determining that PDCP duplication transmission needs to be performed on a radio bearer, sending a PDCP data packet to be transmitted on the radio bearer to a DU, and instructing the DU to perform the PDCP duplication transmission;
wherein the processor is specifically configured to:
if the radio bearer is an SRB, then send a PDCP data packet to be transmitted on the SRB to the DU through F1 control plane, and instruct the DU to perform the PDCP duplication transmission through an Information Element, IE, in a corresponding F1 interface message; or
if the radio bearer is a DRB, then send a PDCP data packet transmitted on the DRB to the DU through F1 user plane, and instruct the DU to perform the PDCP duplication transmission in a corresponding data packet header of user plane.

8. The device according to claim 7, wherein the processor is further configured to:
notify the DU that the radio bearer supports the PDCP duplication transmission through an F1 interface message after determining that a radio bearer of a terminal supports PDCP duplication transmission;
notify the DU that the radio bearer supports the PDCP duplication transmission through an F1 interface message during a UE context setup process or a UE context update process.

9. A duplication transmission device, comprising: a processor, a memory and a transceiver; wherein the memory stores data used by the processor when performing operations, and the transceiver is configured to receive and send data under the control of the processor;
wherein the processor is configured to read a program in the memory and perform the method according to claim 4.

10. The device according to claim 9, wherein the processor is further configured to:
establish a plurality of RLC entities and logical channels used by the PDCP duplication transmission for the radio bearer after receiving a notification of the CU that the radio bearer supports the PDCP duplication transmission through an F1 interface message;
allocate a different TNL address for each logical channel if the radio bearer is a DRB after receiving a notification of the CU that the radio bearer supports the PDCP duplication transmission through an F1 interface message.

11. A non-transitory computer readable storage medium storing a computer program thereon, wherein the program, when executed by a processor, implements the method comprising determining, by a Central Unit, CU, that Packet Data Convergence Protocol, PDCP, duplication transmission needs to be performed on a radio bearer; and sending, by the CU, a PDCP data packet to be transmitted on the radio bearer to a Distribute Unit, DU, and instructing the DU to perform the PDCP duplication transmission, or the method of claim 4.

* * * * *